United States Patent [19]

Walsh et al.

[11] Patent Number: 4,820,469
[45] Date of Patent: Apr. 11, 1989

[54] METHOD AND APPARATUS FOR PRODUCING THERMOPLASTIC AND PRODUCTS PRODUCED THEREFROM

[75] Inventors: Martin J. Walsh; Eufredo G. Maury, both of Brampton, Canada

[73] Assignee: Colortech Inc., Ontario, Canada

[21] Appl. No.: 882,263

[22] Filed: Jul. 7, 1986

[30] Foreign Application Priority Data

Jul. 9, 1985 [CA] Canada .................. 486540

[51] Int. Cl.⁴ .............................. B29C 47/00
[52] U.S. Cl. .................. 264/506; 264/514; 264/564; 264/143; 264/177.1; 264/211.21; 264/349; 264/DIG. 69; 425/205; 425/209; 425/382.3
[58] Field of Search ............ 264/514, 564, 177.1, 264/211.21, 140-143, DIG. 69, 349, 506-508, 102; 425/205-209, 200, 202, 376 B, 67, 382.3

[56] References Cited

U.S. PATENT DOCUMENTS

| | | |
|---|---|---|
| 2,767,437 | 10/1956 | Marshall . |
| 3,147,514 | 9/1964 | Reilly . |
| 3,259,374 | 7/1966 | Doebl et al. . |
| 3,305,894 | 2/1967 | Boden et al. . |
| 3,353,974 | 11/1967 | Trimble et al. ............ 264/349 |
| 3,737,506 | 6/1973 | Martin et al. . |
| 3,773,586 | 11/1973 | Koch et al. ............... 264/37 |
| 3,843,757 | 10/1974 | Ehrenfreund et al. . |
| 3,999,046 | 12/1976 | Porter . |
| 4,002,891 | 1/1977 | Porter . |
| 4,013,745 | 3/1977 | Brinkmann et al. ......... 264/37 |
| 4,046,849 | 9/1977 | Lever et al. ............... 264/349 |
| 4,117,073 | 9/1978 | Koch et al. . |
| 4,137,023 | 1/1979 | Moked et al. ............. 418/15 |
| 4,142,804 | 3/1979 | Crocker . |
| 4,162,880 | 7/1979 | Cobbs, Jr. et al. ......... 425/202 |
| 4,213,709 | 7/1980 | Valsamis . |
| 4,213,747 | 7/1980 | Friedrich . |
| 4,234,259 | 11/1980 | Wiedmann et al. . |
| 4,332,479 | 6/1982 | Crocker et al. . |
| 4,448,737 | 5/1984 | Johnson .................. 425/202 |
| 4,452,750 | 6/1984 | Handwerk et al. ......... 264/349 |
| 4,490,323 | 12/1984 | Thomson ................. 264/211 |
| 4,642,040 | 2/1987 | Fox ........................ 425/208 |

FOREIGN PATENT DOCUMENTS

| | | |
|---|---|---|
| 633017 | 10/1963 | Belgium . |
| 532846 | 11/1956 | Canada . |
| 692830 | 8/1964 | Canada . |
| 753561 | 2/1967 | Canada . |
| 756006 | 4/1967 | Canada . |

(List continued on next page.)

OTHER PUBLICATIONS

Brochure-VX-20 of Luwa, "Maag Vacorex Polymer Pump".
Brochure-TX-32 of Luwa, "Therminox Polymer Pump".
Brochure-Werner & Pfleiderer, "The Gelimat System".
Brochure (1 page) Drais-Werner & Pfleiderer Gelimat.

Primary Examiner—Jeffery Thurlow
Attorney, Agent, or Firm—McFadden, Fincham & Co.

[57] ABSTRACT

Method and apparatus are disclosed for producing various materials and products of a thermoplastic nature. In the method, thermoplastic material is subjected to a high intensity mixing and melting step to form a material which is a non-flowable and self-sustaining mass, having a temperature low enough to prevent it from being readily flowable, in a subsequent step, the method involves placing the material between a fixed rigid surface and a moving rigid surface to force air from the mass and to densify, compress and convert it to a flowable form whereafter it is passed through a restricted opening. There is provided a combination of a high intensity mixer and melter in which the product produced is then fed into a gear-pump where the material is passed between a fixed rigid surface and a moving surface. Higher output speeds can be obtained using the method and apparatus compared to conventional extrusion techniques; in addition, materials not readily processable by conventional extruding operations can be processed.

29 Claims, 1 Drawing Sheet

FOREIGN PATENT DOCUMENTS

| Number | Date | Country | Class |
|---|---|---|---|
| 821008 | 8/1969 | Canada | |
| 819446 | 8/1969 | Canada | |
| 864415 | 2/1971 | Canada | |
| 965080 | 3/1975 | Canada | |
| 1017105 | 9/1977 | Canada | |
| 1190017 | 7/1985 | Canada | |
| 61147 | 9/1982 | European Pat. Off. | 264/37 |
| 0105233 | 4/1984 | European Pat. Off. | |
| 0134343 | 3/1985 | European Pat. Off. | |
| 0144932 | 6/1985 | European Pat. Off. | |
| 2721169 | 11/1978 | Fed. Rep. of Germany | 264/349 |
| 2747490 | 4/1979 | Fed. Rep. of Germany | 264/349 |
| 129200 | 1/1978 | German Democratic Rep. | 425/203 |
| 468800 | 9/1975 | U.S.S.R. | |
| 324648 | 1/1930 | United Kingdom | |
| 500298 | 2/1939 | United Kingdom | |
| 953733 | 4/1964 | United Kingdom | |
| 992310 | 5/1965 | United Kingdom | |
| 1170728 | 11/1969 | United Kingdom | |
| 1190395 | 5/1970 | United Kingdom | |

METHOD AND APPARATUS FOR PRODUCING THERMOPLASTIC AND PRODUCTS PRODUCED THEREFROM

This invention relates to the extrusion of molten resinous materials.

More particularly, this invention relates to a novel combination of components to provide an apparatus for extruding resinous material; and to the sequence of steps for the extrusion of molten resinous material. Both method and apparatus have several embodiments in which different forms, profiles or the like of material are extruded and produced and each aspect will be described according to its characteristics.

One development herein relates to a method and apparatus for producing a master batch; another to the method and apparatus for producing profile shapes, e.g., siding materials, corrugated tubing, etc.

Various methods of master batch preparation are currently utilized. Master batches include a carrier resin and an additive to obtain the desired characteristics, e.g. for producing plastic film, one can extrude master batch pellets with natural or base film resin to provide the resulting extruded film with desired characteristics. Typical additives include color additives e.g. lead chromate, $TiO_2$, iron oxide, ultramarine blue; U-V inhibitors, anti-block additives, cling additives, slip additives, (coefficient of friction), anti-static additives, etc. Combinations of the above and others may be utilized depending on desired characteristics. Master batches contain a wide range of additives, e.g., 2 to 50% or more, the remainder comprising resin.

Typically master batch ingredients are mixed in e.g. a Banbury mixer, whereafter the output is erased through a colander or two-roll mill, through a water bath and finally, to a pelletizer.

A disadvantage of such prior art is that the solids content of the master batch has not generally reached levels higher than 50%. In attempting to achieve higher solids the mill will not feed consistently since slippage occurs on the rolls due to the high solids content. In addition, if the rolls are not carefully temperature controlled, other processing disadvantages occur—e.g. if the roll temperature is too high, the product will tend to stick to the rolls; if the roll temperature is too low, product slippage on the rolls occurs resulting in inconsistent feeding. Carefully controlled temperatures are a requirement for such a process. Mixers of the type currently in use with such systems are very costly (a large capital outlay is necessary) and such mixers have a high energy consumption. Both Banbury and conventional extruders are heated with eleictricity or oil. The process is also slow and the amount of residence time of the polymer is fairly long—hence the energy used in such processes far exceeds that theoretically required to melt and mix the ingredients.

Another common prior art process for master batch includes blending the master batch ingredients in a high intensity mixer; then the blend is cooled and fed to a twin-screw extruder where it is extruded through a strand die. The strands may be cut off on the face of the die into pellets, or subsequently pelletized. This product typically has 50 to 60% solids content. With such a system, it has not been possible to process master batch with solids content higher than 60%. One reason for this is the long residence time of the ingredients within the extruder. When processing master batch which contains, for example, iron oxide as a coloring additive, the desired yellow color may change to red if the mixture remains too long in the extruder. Temperature may thus have an effect on the final color. The temperature in an extruder can vary and it is very difficult, if not impossible, to control the extruder temperature.

Such systems usually require the use of processing aids—e.g., low molecular weight polyethylene which acts as a lubricant, dispersing agents such as stearates, etc. These processing aids are solely for facilitating the production of the master batch and have no use whatsoever for the end user. Such processing aids, are subject to degradation and tend to form deposits on the inner surface of the die as well as build-up on the die lips both in the master batch and subsequent processes, resulting in shut-down time and high maintenance costs.

A further limitation on such systems is output. Generally, a typical twin screw extruder output is restricted to 360 to 540 Kg./hr., restricted by the extruder itself or by the liquid feed to extruder.

Another factor in the prior art is that the selected carrier resin must have the appropriate melt index. If not, various problems can be encountered in extruded film from the master batch, e.g., a high melt index can result in a loss of strength of the film.

Another development disclosed herein relates to profiles—e.g. siding for houses, etc;, trim for vehicles, window frames or extruded moldings in general. Siding is one example of such extruded profiles, e.g. "polyvinyl chloride" siding. At present, it is produced from raw materials which have different properties depending on the supplier. Thus a powder form of the resin with additives is passed through a conventional single or twin extruder and an extrusion die. Problems arise due to machine direction surges or variations resulting from extruder operation. Such a variation causes "oil-canning" (waviness) which is due to differential cooling as the output from the extruder is thicker in sections than the average of the extrudate. In the case of polyvinyl chloride siding, as the materials are very temperature-sensitive, a 2 or 3 degree variation makes a large difference in the product; to provide uniform extruding temperatures, manufacturers normally run at a very slow speed to try to obtain a fairly good product. They generally run only at 135 to 270 Kg./hr. Current methods and equipment for siding, trim, etc. require that on shutting a machine down, with e.g. PVC resin, undesirable by-products can result and clean-up times are substantial. In practice actual operating conditions determine the impact strength of the final product, which is temperature and stress dependent. Operating parameters are very stringent and variations can produce scrap material or undesirable characteristics in the end product. Such products find many uses in industry ranging from window frames to moldings, consumer products such as fridges and stoves, sheeting which finds many applications, swimming pool coatings, and various plastic moldings. They are widely used, but tend to be expensive because of the slow production time and the current equipment that is used.

Another development of this invention relates to a method of re-processing film-forming scrap thermoplastic material into raw thermoplastic material, which possesses substantially the same extrudable properties as virgin material.

Processing of thermoplastic materials generates significant amounts of scrap material in, e.g., film-forming operations. In conventional blown tube operations, a blown tube is formed into various types of products or articles ranging from garbage bags to sheet. At various stages, scrap film or extrudate is generated, e.g. cuttings, faulty production runs, etc.

At present, most scrap is sold to specialized firms who reprocess the scrap and re-pelletize the material or sometimes, in an in-house operation, the same material will be used in different operations. Re-processed film material can normally only be used for lower grade products once re-pelletized—e.g., refuse film or bags. For many years, since this type of product is made from a lower grade of film, typically scrap film, which may have a wide range of colours, a refuse film or bag manufacturer would add a colouring agent to "hide" the multitude of colours which scrap film from different sources. Also, scrap film from different sources will contain different additives in varying amount and consequently, re-processing the film into anything but a type of film or product which does not depend on a narrow range of properties is difficult.

Re-processing of film or scrap material through a conventional extruder invariably leads to a lowering of the properties of the base material. Polyethylene which has been extruded two or more times will have a much lower melt index compared to the base or virgin material, since it will have been subjected to heating, shear and other processing characteristics twice. As the resin is oxidised in these processes, this leads to "off-spec" resins, as well as discoloration. Thus re-processed materials are normally unsuitable or unusable for the purpose for which the material was initially extruded.

Re-processed material with lower properties such as melt index obviously cannot command the price of the higher once-extruded material and in certain cases, the use of re-processed material is forbidden in certain products due to degradation of additives in the scrap material, etc.

It would be desirable if some method were found for re-processing scrap thermoplastic material into raw thermoplastic material to have substantially the same extrudable properties without the disadvantages outlined above; applicant has developed a method for re-processing scrap material which overcomes the disadvantages of the prior art.

In a further development, there is also provided an improvement to a blown tube process. The blown tube process is well known; it involves extruding a molten polymer in generally a barrel-type extruder, passing the polymer through a die creating a bubble which is cooled with the bubble subsequently being collapsed (and the tube optionally being slit into sheet or formed into smaller tubes).

Barrel extruders employed for this purpose, and their production capacity is limited by several factors; e.g. the amount of polymer that can be extruded, the cooling capacity of the equipment, etc. Even on very large diameter dies, the practical limitations are such that only limited amounts of polymer can be extruded per hour—in the range of the very low hundreds of Kgs.

Modifications have been proposed to increase the output. In normal extruders, however, there are limiting factors such as the required residence or dwell time; feeding pressures and temperatures for dies, etc. which have inherent limitations beyond which further output increases become marginally advantageous. It would be advantageous if a system could be developed for a blown tube process where a die was fed with a much higher output, thus enabling significant economical advantages to be realized.

Another development disclosed herein relates to a co-extruded product and a method involving two or more separate feed streams which are joined together, after processing, to form a laminate.

Various techniques for producing co-extruded products are known; these may e.g. involve the blown tube method or a flat die. Such methods employ a conventional extruder to provide a flowable molten liquid mass of a thermoplastic material; two or more such extruders feed molten resinous material which is then combined into a single circular or flat die, and the resulting product of two layers is extruded. Prior techniques for co-extruding are relatively slow and limited by the type of thermoplastic material which can be satisfactorily processed and by the type of extruder. Conventional barrel or screw-type extruders have the disadvantages outlined, including high operating temperatures so that processing of certain materials, e.g. various additives, cannot be either successfully achieved or only with loss of properties.

Conventional co-extruded materials, possibly with different additives in the different layers or of different materials (i.e., different thermoplastic resins) have application in a wide variety of products ranging from bags or containers, sheet or film for covers, cable jacketing, etc. In most cases, requirements for commercial applications include different layers having different properties achieved either by utilizing the same type of material with different properties or with two different materials. Depending on compatibility of the resins, a very strong bond between the layers can be achieved or a very weak bond can result—in which case, the co-extruded material may also find application for "peel apart" products.

In co-extruded products, there are also requirements for the layers to be able to be processed differently so that even where the same material is involved, different properties will be imparted by different processing techniques. In other cases, with the same or different feeds of resin, it can be desirable for one or more layers of a multi-layered laminate to form a cross-linked resin or for another layer to contain a foaming agent, etc.

Cross-linking agents, and even foaming agents, are normally highly temperature sensitive (e.g., peroxide cross-linking agents) and they cannot tolerate high temperatures in conventional extruders. With this invention, these disadvantages and limitations can be overcome to produce co-extruded products which can be used in different applications with properties not otherwise attainable.

In a further development, there is also provided an improvement relating to corrugated tubing, such as is used in drainage pipe for agricultural and the like purposes. Conventionally, such corrugated tubing may employ scrap material which is separatedly densified, extruded and pelletized using barrel extruders. Thus master batch product is made, and then the basic step of making the tubing is carried out—e.g., by extrusion and then corrugation. Upon extrusion, the tubing usually does not have a uniform wall thickness and a production rate of about 272 Kg/hr is all that is normally possible. According to a development of the present invention, the above three steps can be combined into a single step, where the scrap film, resin and carbon black are processed according to the present invention, and directly extruded into corrugated tubing. The process of the present invention will result in a corrugated tubing product having better crush strength with thinner wall thickness, as well as a uniform thickness throughout. Production rates in accordance with the present invention can reach over 1000 Kg./hr.

In accordance with the different developments disclosed herein, the disadvantages associated with master batch production, re-processing, blown tube production, corrugated tubing, siding and the like profiles and co-extrusion, are overcome and there is provided a very significant increase in production speed while maintaining high quality products.

Briefly summarized, in each of the processes for preparing the above products, a special non-flowable feed material is utilized in a separate step where such feed material is fed to a subsequent high-speed processing step to convert the feed material into a flowable, processable form and thereafter, the process of each aspect described above can then form the products by appropriate formation through a die.

In greater detail, the method of the present invention comprises forming one of the above defined products by providing an extrudable material to be extruded; in a first step, simultaneously mixing and heating said material to at least the melting temperature thereof at which point said material is in the form of a relatively non-flowable, self-sustaining mass in a partially molten state, said mass having a relatively low density to help prevent said mass from being flowable to form a feed material, in a second step feeding said feed material between a fixed rigid surface and a moving rigid surface to remove entrapped air from aid mass and to densify, compress and convert said mass to a flowable form; and extruding a densified and compressed flowable product of the type defined above.

The process of the present invention achieves very significant increases in production speeds, utilizes less energy than conventional processes and imparts to the products improved properties which in most cases, are not achievable by conventional processes.

It is an object of the present invention to provide a method for master batch preparation blown tube, corrugated tubing, siding or like moldings, re-processing of scrap, etc. which achieves higher outputs per capital cost, and to provide improved products where e.g. the master batch can contain up to 80–90% solids content.

Another object is to provide a method for the broader application of resins and compounds where e.g. master batch preparation can use any carrier resin, and in which conventional processing aids can be eliminated.

Still another object is to provide a more economical method for preparing such products as e.g. master batch preparation, which uses less expensive equipment and substantially lower energy cost, with less maintenance requirements, less space and less labour than conventional methods. The invention also uses a process which reduces residence time, and heat and shear histroy of the components of the products.

In the case of an extruded master batch solid product it may be in a continous form, and there can be used the step of severing the extruded product at the die to form pellets or granules of master batch or alternatively, taking solid extrudate, preferably in the form of a ribbon of the same, passing it through a bath of cooling liquid, and when cooled, subjecting it to a pelletizing step to form master batch pellets.

The invention also provides an apparatus for carrying out the above steps, for the various methods comprising the combination of mixing and heating means which simultaneously heat and mix a material to be formed to at least its melting temperature and to a point where the material is in the form of a non-flowable, self-sustaining mass but still in a partially molten state, said mass having a temperature low enough to prevent the mass from readily being flowable, feeding means for feeding said mass in this state to a compression means, comprising a fixed rigid surface and a moving rigid surface whereby said mass is densified and compressed to a flowable form, and means for extruding the resultant densified and compressed flowable product through a restricted opening.

In the apparatus the means subjecting the starting material to a high intensity mixing step preferably comprises a type of apparatus marketed by Werner & Pfleiderer Corporation as the "Drais-WP Gelimat" system, and hereinafter referred to as a "Draiswerke" high intensity mixer, which is capable of providing a low density viscous mass semi-molten product without converting the material to a densified or compressed form. It is important that such a device, whenever a specific type is employed, does not form a readily flowable, liquid molten mass of the product upon mixing of the product and heating the same to a temperature sufficient to render it molten. Such a mixer should provide a substantially homogeneous product on mixing where the starting materials and any additional compounds are intimately admixed to form a uniform blend. It is imperative that the product when mixed does not form a self-sustaining readily flowable mass, but rather the special feed material in the form of a non-flowable viscous product of relatively low density to help render it non-flowable. The mixing step and apparatus must be capable of melting the product so that upon mixing it is actually in a substantially molten state, but not a readily flowable form.

The second component of the apparatus when combined in the present invention is of the special type which may be broadly described as a "gear pump" and which takes the non-flowable mass from the mixer, and in which the mass is then fed between a fixed rigid surface and a rotatably moving surface to densify, compress and convert the non-flowable mass into a flowable form. Such a component compresses a non-flowable mass to a flowable mass by exerting a very high pressure on the mass, to substantially remove entrapped air or the vast majority of entrapped air, which results in the flowable mass being produced and which can then be extruded through a die.

Such a means preferably comprises a gear pump including a pair of rotating gears, which may be bevelled or "straight" and which receive a stream of the non-flowable mass to engage the mass between fixed rotating gears and to discharge the same after working of the mass between the rotating gears. One general type of apparatus is known as a "Luwa" gear pump which can be modified to provide a larger throat to receive the mass of non-flowable material under atmospheric pressure. In passing through the modified pump, there is thus provided a high compression ratio which is higher than conventional equipment, in the absence of oxygen compared to conventional equipment.

In producing master batch and in accordance with the method, the components will be charged to the mixing device in appropriate proportions; such products and starting materials are well known to those skilled in the art. One of the advantages of the present invention is that higher quantities or greater concentrations of critical components can now be mixed successfully when charged into the mixer for processing. Different types of carrier resins and quantities can be employed in contrast to the prior art, which due to the nature of the process of this invention is basically insensitive to viscosity, and consequently, any melt index resin can be employed.

Another advantage is the relatively short overall residence time, and the absence of oxygen, in the apparatus employed to densify and compress the material, which reduces possible deleterious effects on the material compared to conventional procedures.

Further, the master batch can include types of additives which could not be very successfully run heretofore particularly with hard to blend additives which broke down due to temperature limitations or the like, in the prior art. Such additives can be added in amounts in excess of those previously employed so that a higher concentrated master batch can be obtained which results in a greater output per unit, compared to the prior art.

The type of thermoplastic "scrap" material employed in the re-processing process may be any suitable thermoplastic material having the properties desired in the resulting extrudate. Thus, polyethylene of varying densities is a large part of the commercially available "scrap" material due to its high volume.

Such material is normally sheet or film, and of varying widths and lengths and generally in a discontinuous form. Polyethylene may also be in the form of trim from bag making operations. There are numerous other forms of scrap materials, e.g. scrap bags, plasma bags, etc.

Other known types of polymeric film, sheet, or scrap material can be re-processed—e.g. materials from copolymers of ethylene, with e.g, propylene, etc. Provided the base polymeric material has not been modified so as to non-extrudable by subsequent processing, such material can be employed in this invention.

Scrap material may have foreign non-film forming materials incorporated into it—e.g. printing inks, additives e.g. ultraviolet, and anti-static and anti-block agents, etc. If the "history" of the scrap material is known, then with the present invention, the same material can be processed to have substantially the same properties, and may possibly be re-used in in applications where only material which has been previously extruded once could only be used. Where mixtures of scrap materials are employed, e.g. materials having different additives, different inks, etc., are used, the present invention permits these to be extruded without degradation of the non-film forming materials. Consequently, such materials may be used in a higher quality film or other end product where previously degradation or volatilization of non-film forming additives or foreign matter caused a problem in re-processing scrap material through an extruder for the second time. In the case of printing inks which are used on various types of products, such inks are normally used on a product or film after extrusion, present day conventional techniques do not permit ready re-processing into materials other than, e.g. refuse containers. Due to the low temperature of the method of the present invention, scrap material with printing inks on the material can be satisfactorily re-processed without degradation of the ink and thus even though the ink may colour the resulting pellets, the degradation of the ink does not occur in most cases.

Other examples of the advantage of this particular method include the fact that various scrap thermoplastic materials which have had to be previously disposed of without re-processing, such as plasma bags, which can be readily turned into high quality re-processed plastic material useful for, e.g., garden hose etc.

In carrying out the method for re-processing to form a non-readily flowable mass, the temperature should not be brought above the volatilization or degradation temperature of the foreign non-film forming materials.

In normal operation, the present method is carried out just at or slightly above the melting temperature of the base thermoplastic material involved. Most printing inks have decomposition volatilization temperatures of below the conventional extrusion temperatures normally employed in the thermoplastic industry, but well above the melting point of the base thermoplastic material, and consequently, the foreign material such as printing inks will merely blend in with the base polymer when using the method of the present invention.

Scrap material from various sources may also contain non-volatile components; therefore, the method of the present invention may incorporate the step of passing the partially molten material after it is compressed and densified into a flowable form, through a filter screen to separate out any non-molten foreign matter.

In further embodiments the re-processed material can be extruded in various forms. The densified and compressed flowable mass can be passed through any desired die shape where a given profile can be extruded. Thus, re-processed scrap material can be extruded as, e.g. film or sheet, a blown tube, etc. The extruded material may also be re-pelletized for subsequent use. After extrusion, conventional cooling steps may be employed.

In another form of master batch preparation according to the present invention, it has been possible to recycle scrap material such as dust created in preparing master batch. Thus, in carrying out the process of preparing master batch, usually hundreds of Kgs. per day of dust comprising resin, pigment, etc. is formed. According to an embodiment of the present invention, it has been found that, e.g., a black master batch product can be prepared in which up to 25% of the product is formed of the dust particles created during processing of other master batch products.

A further alternative after the molten mass is densified and compressed, can be to use the material for a blown tube process; it may be used as the sole material or, only a portion of the feed material. As such, the densified and compressed mass may be fed to a conventional extruder when used as a portion of the feed for the blown tube process; alternatively, a blown tube die can be directly connected to the apparatus used in carrying out the method of the present invention.

In the process of preparing blown tube of this invention, the traditional process can be said to be broken up into constituent parts, resulting in a greater energy efficient operation. The applicant's method permits the high speed production of various polymers conventionally employed, which may optionally include conventional additives. The majority of blown film tube is primarily produced from polyethylene of various densities or copolymers of ethylene with other monomers such as propylene, etc.

In applicant's blown tube method, the polymer may be passed through two densifying and compression steps in order to remove a maximum amount of entrapped air and thus prevent air from being included in the polymer when passed through the blown tube die. Otherwise, a densified compressed mass of polymer may be fed back into the densifying step a second time to remove any occluded air. Preferably, the densified flowable mass of polymer is substantially free from occluded air when fed into the blown tube die, since the inclusion of air-bubbles will generally be deleterious to the production of a blown tube.

The blown tube die employed is preferably a high resistance type die known in the art; otherwise, conventional equipment may be employed, including slitting, tube formation, etc.

The tube may be cooled and if so, a high speed cooling process must be employed. This process is preferably that described in Leco's U.S. Pat. No. 4,434,129 of Feb. 28, 1984, utilizing high steam as the cooling medium. Whatever cooling process is used, it must remove the heat from the molten tube as it is extruded in order to obtain very high output production. In carrying out the method, production rates upwards of 1000 pounds per hour may be obtained, which is a vast and significant improvement over the production rates of conventional blown tube processes using conventional extruders.

Applicant's method for co-extruded products by the steps defined herein will include the steps of providing separate flow paths for each of the streams while in a second step feeding each mass separately between the fixed rigid surface and the moving rigid surface, and then combining the streams in the flow direction in a common flow path into a single layer of material and extruding the combined layers as a single extrudate.

In the method, each separate stream of resinous material is joined together to form a common stream, i.e., a single layer of the combined materials, after the streams are individually passed between the fixed rigid surface and the moving rigid surface—i.e., after the individual streams are densified, compressed and converted into a flowable form. The individual streams are preferably joined together in a common chamber with a minimum of mixing to form a co-extruded product which has distinct separate layers. However, in the chamber where the materials are joined together, some degree of mixing may take place to form an interface between the two layers which may be a blend of the different materials—again depending on the desired specifications for the end product and its end use. In other cases, it may be desirable to maintain a sharp line of demarcation at the interface and accordingly, in carrying out the method of the invention, the step of combining the streams into a single layer, can be carried out to minimize or increase the mixing of the different materials at the interface.

In the method, two separate feed streams are employed and to this end, two separate mixing devices may be employed for this purpose, such devices being the "Draiswerke" high intensity mixer. Each "Draiswerke" high intensity mixer will thus provide a source of relatively non-flowable self-sustaining mass of the thermoplastic resinous material, which is in a partially molten state, and the separate resinous feed of the appropriate materials are preferably then fed individually to the type of gear-pump assembly illustrated in the drawings, each stream being fed separately to one side of the gear-pump. Co-extruded or multilayered products provided by the present invention may be e.g. two component pellets each having different heat and/or shear history. Thus, e.g., a cross-linkable compound for cable jacketing may contain one portion with highly fluxed (high shear and temperature) carbon black and resin while the other portion contains high temperature sensitive cross-linking agents, such as peroxide additives, which cannot tolerate high temperatures. Temperature sensitive foaming agents may also be incorporated into resins simultaneously.

With the method of this invention, following production of the single co-extruded layer, the material may be subjected to further steps; for example, the product produced may be cooled by suitable cooling techniques, following which the product is then pelletized according to conventional procedures.

Typically, the materials employed for each of the resinous feed streams for co-extrusion may comprise polyolefin, either as homopolymers or copolymers, with or without additives. Other classes of thermoplastic resins may be used, either individually or in combinations with the polyolefins, to produce co-extruded products having different properties. Polyethylenes of high, low and medium densities, or copolymers of ethylene with one or more other monomers may be employed. The choice of the resinous material will depend on the properties desired in the end product, as well as the respective additives. Thus, the resinous materials will be different for different applications ranging from siding to extruded sheet material used for packaging.

Circular or flat or plain profile dies may be used. Using a circular die, one may obtain various circular configurations and depending on the type of circular die, again a different range of products may be produced—e.g., thin or thick walled circular profiles such as pipe, tubing or the like, etc.

The products produced by the methods of the present invention have many advantageous properties over similar products produced by the prior art. In the case of re-processed product, there may be obtained material which has the same properties as the original material, and at very high speeds. In the case of corrugated tubing uniform products at high speeds are obtained which is a vast improvement over the prior art.

Referring to the attached drawings, there is illustrated a preferred form of a gear pump according to the present invention, in which.

Figure 1:
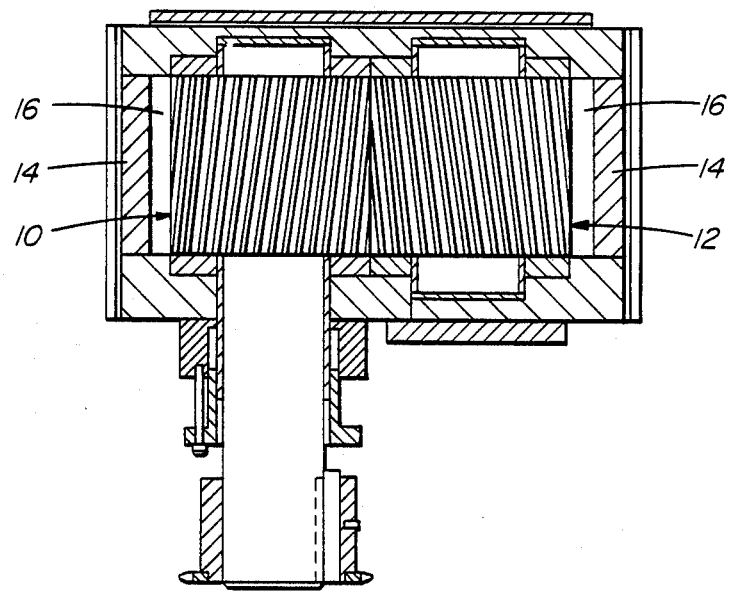
FIG. 1, is a top plan view of a gear pump used in the present invention.
Figure 2:
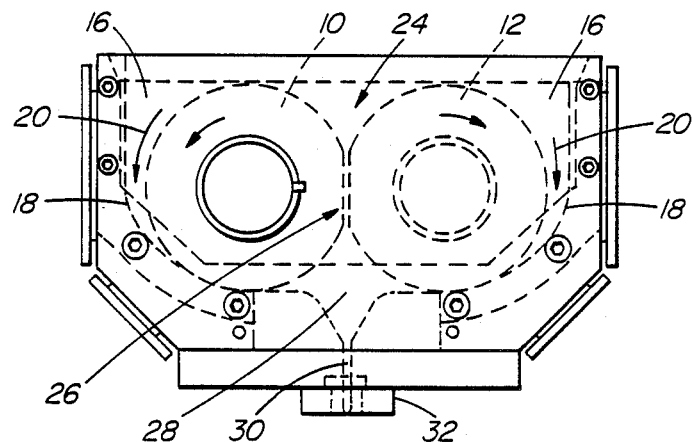
FIG. 2, is a side elevation of the apparatus of FIG. 1 showing the gears.

The apparatus of FIGS. 1 and 2 may be employed in the examples which follow; the apparatus may be combined with a "Draiswerke" high intensity mixer to feed into the gear-pump assembly a charge of a molten mass (as described in the examples). The gear-pump assembly was set up to have the "Draiswerke" high intensity mixer discharge the relatively low density mass of resin onto a conveyor, which was then fed to the mouth of the gear-pump assembly.

In the gear-pump assembly, the main elements consist of a pair of rotating gears 10, 12 rotating in the direction of the arrows (FIG. 2), driven by respective drive shafts, which in turn, are driven by a motor through a common drive shaft. Gears 10 and 12 have surfaces intermeshing with each other, angularly displaced relative to a longitudinal axis of the respective gears. Gears 10 and 12 are spaced from sides 14 of the housing; between the gears 10, 12 and sides 14 there is a restricted mouth opening 16. Sides 14 (FIG. 2) taper downwardly and inwardly forming a generally converging surface 18 towards gears 10, 12—i.e. a converging chamber 20 is provided through which a mass of resinous material discharged by the "Draiswerke" high intensity mixer into the gear pump assembly passes. The mass of molten resin as discharged from the "Draiswerke" high intensity mixer, is generally placed into the gear pump in the area shown by the arrow 24, where the polymer mass in then fed to the converging area 20 and placed under compression to densify and cause the mass of polymer to flow between a fixed surface and the rotating gear wheel under high 5 compression and force. The individual gears of the wheels 10,12, meshing together as at 26 form one point of a chamber 28 where the polymer after being compressed and densified by the rotating rollers and the converging chamber wall 18, is fed into before being forced from the chamber 28 through a discharge opening 30 and if desired through a profile die 32 at the bottom of the housing.

Converging area 20 may be adjusted by providing adjustments to the mounting of the gear 15 wheels to vary the area between the gear 10, 12 and the lower walls 18, or by adjustable compression plates at the lower portion of the assembly to vary the distance between the gear wheels 10, 12 and portion 18.

Profile die 32 can be any general type of die assembly as desired to either form a die for extruding a profile shape, or for feeding resinous extrudate to a further operation.

With respect to co-extrusion, and as illustrated in the drawings, one source of relatively non-flowable thermoplastic material is fed to one restricted mouth opening 16, with the other source being separately fed to the opposed restricted mouth opening 16. To this end, feeding of the separate sources of material differs from that previously described where, for instance, a single source polymer mass may be fed to the area indicated by arrow 24. Using the apparatus described in this application, and due to the direction of the rotation of the gear wheels 10 and 12, each source of resinous material will be separately compressed to densify and cause the mass of polymer to flow between the respective fixed surface and the respective rotating gear wheel.

Depending on the particular shape of the chamber 28, and/or by providing other modifications to the apparatus to maintain the separate identity of the compressed densified molten streams, the degree of mixing of the streams at the interface can be limited or varied as required prior to their being combined.

At the point where the two separate streams are combined and extruded, through a die opening, the type and character of the product may be varied depending on the type of die employed and the end product desired. For example, using this particular method, and providing a profiled die having an extrusion orifice for siding materials suitable as building exteriors, it is possible to extrude multi-layered or co-extruded resinous combinations in which the layered "inside" can be one type of coloured vinyl resin, which may contain "regrind" material while the other or "outer" layer of the same or different vinyl material may contain a high gloss resin with a high performance U-V stabilizer. Thus, as described in this application for the development relating to polyvinyl chloride siding, the teachings therein may be employed for the extrusion of two or more layers as described above; in this respect, the type of materials may be varied and at least one layer other than polyvinyl chloride, or a copolymer, may be employed with additives for providing siding.

Having thus generally described the invention, reference will now be made to the accompanying Examples illustrating preferred embodiments only.

EXAMPLE 1

To a 40 liter Draiswerke mixing apparatus was charged 10 pounds of a white master batch mixture comprising: 47% titanium dioxide, 20% calcium carbonate and 33% polyethylene. The tiantium dioxide and calcium carbonate components were in a finely divided particulate form, while the polyethylene was low density polyethylene in the form of a fine granular resin. Prior to charging the three components were intimately mixed to form a homogeneous mixture. This mixture was fluxed within the mixer for 12 seconds rising to a temperature of 140° C. Upon discharge the product was in the form of a non-readily flowable, high-bulk, self-sustaining mass in a partially molten state. Thereafter, this mass was passed through a gear pump of the type shown in the drawings. The gear pump was operated at a speed of 32 rpm and was maintained by suitable means at a temperature of 205° C. The product, after passing through the gear pump, was forced through a die into ribbon form which was then water-cooled and passed to a pelletizer to form pellets of the white master batch. The product exiting from the gear pump had a bulk density of 66 lb/ft.$^3$, and was produced at a rate of 1542 Kg./hr. This example indicates that products containing more than 50% inorganic solids in the formulation could be processed through use of the invention. The solids were intimately dispersed and when the master batch was used to make film the resulting film was free of gels or agglomerates from the master batch. In contrast the same products could not be processed with use of a mill. In addition, a very high production rate for the product was achieved.

EXAMPLES 2-12

For the following Examples, the procedures of Example 1 were repeated using the formulations noted in Tables I and Ia and under the conditions specified. The product characteristics are noted in Table II.

TABLE I

| Example | Ingredients | Charge Amount | Mixing Step Residence Time (Sec) |
|---------|-------------|---------------|----------------------------------|
| 2 | Titanium dioxide | 48% | 12 |
|   | Calcium carbonate | 4% | |
|   | Polyethylene | 48% | |
| 3 | Lead chromate | 40% | 11 |
|   | Titanium dioxide | 10% | |
|   | Calcium carbonate | 10% | |
|   | Polyethylene | 40% | |
| 4 | Molybdenate orange | 9.5% | 15 |
|   | Organic red | 5.5% | |
|   | Calcium carbonate | 15% | |
|   | Polyethylene | 70% | |
| 5 | Iron oxides | 16% | 12 |
|   | Titanium dioxide | 34% | |
|   | Polyethylene | 50% | |
| 6 | Iron oxide | 35% | 13 |
|   | Carbon black | 14% | |
|   | Calcium carbonate | 10% | |
|   | Polyethylene | 40% | |
| 7 | Carbon black | 50% | 28 |
|   | Polyethylene | 50% | |
| 8 | Mica | 12% | 13 |
|   | Calcium carbonate | 6% | |

TABLE I-continued

| Example | Ingredients | Charge Amount | Mixing Step Residence Time (Sec) |
|---|---|---|---|
|  | Foaming agent | 35% |  |
|  | Polyethylene | 81.35% |  |
| 9 | Carbon black | 40% | 13 |
|  | Polyethylene | 60% |  |
| 10 | Titanium dioxide | 60% | 16 |
|  | Calcium carbonate | 10% |  |
|  | Inorganic blue | .5% |  |
|  | Polyethylene | 29.5% |  |
| 11 | Silica | 25% | 18 |
|  | Polyethylene | 75% |  |
| 12 | Fatty acid amide | 5% | 13 |
|  | Polyethylene | 95% |  |

TABLE 1A

| Example | Discharge Temp °C. | Pump RPM | Pump Temp | Production Rate Kg./Hr. |
|---|---|---|---|---|
| 2 | 135 | 23 | 205 | 998 |
| 3 | 140 | 22 | 195 | 998 |
| 4 | 130 | 22 | 192 | 725 |
| 5 | 130 | 27 | 205 | 998 |
| 6 | 150 | 22 | 205 | 91 |
| 7 | 170 | 14 | 205 | 499 |
| 8 | 150 | 20 | 180 | 499 |
| 9 | 150 | 15 | 205 | 499 |
| 10 | 140 | 32 | 205 | 1361 |
| 11 | 130 | 23 | 190 | 590 |
| 12 | 125 | 23 | 175 | 590 |

TABLE II

| Example | Bulk Density (lbs/ft$^3$) | Product |
|---|---|---|
| 2 | 54 | Master batch pellets |
| 3 | 56 | 60% solids master batch |
| 4 | 40 | Master batch (red) |
| 5 | 56 | Master batch |
| 6 | 58 | Master batch |
| 7 | 42 | Master batch |
| 8 | 33 | Filled foam master batch |
| 9 | 40 | Master batch |
| 10 | 70 | Master batch |
| 11 | 33 | Inorganic additive |
| 12 | 33 | Organic additive |

The products of Examples 2 through 12 were used in various formulations to make film and in each case, the products incorporated as master batch additives provided films with very good appearance, and in some cases provided products which could otherwise not be produced by conventional equipment. Such end products as films were found to be substantially free from gels or agglomerates and well dispersed. Example 12 also shows that products with little or no pigments but containing organic additives can be produced whereas on a conventional mill such products slipped and could not be made into narrow sheet form for dicing.

EXAMPLE 13

54% Carbon black (Cabot 762) was blended with 2% stearate and the balance linear low density polyethylene (5103) having a melt index of 12 in a Welex mixer for 30 seconds. The resultant homogeneously blended mixture was charged to a "Draiswerke" high intensity mixer, fluxed therein whereafter the self-sustaining mass produced was processed through a gear pump, die formed into a ribbon, water cooled and then pelletized.

Blown film produced using the above black master batch product had a good appearance, although with a slight grain which is quite superior to that obtained by any other conventional process.

EXAMPLE 14

50% Carbon black (Cabot 762) was blended with 2% stearate and the balance linear low density polyethylene (5101) - M.I.12 in a conical blender for 20 minutes. The procedure of Example 13 was then followed and blown film produced using the black master batch product had a good appearance with no irregularities.

EXAMPLE 15

The procedures of Example 15 were repeated using 50% carbon black (Cabot 762) blended with 50% linear low density polyethylene (5102) - M.I. 12.

Blown film produced using the resultant black master batch product had a good appearance, with no irregularities indicating that a well dispersed 50% master batch can be obtained with use of the present invention, without requiring the use of stearates as dispersing agents.

EXAMPLE 16

This example illustrates the relatively insignificant changes in resin characteristics before and after processing through use of the invention. A Unipol resin having a nominal M.I. of 1 was used. The tests carried out were a standard melt index (2160 gm. load) test and a higher shear flow rate test (18,300 gm). The pure resin was tested prior to being processed, and after being processed under normal conditions for producing a white master batch (exclusive of TiO$_2$). The results are as follows:

|  | Before Processing | After Processing |
|---|---|---|
| Density: | .9180 | .9180 |
| M.I.: | 1.08 | 1.02 |
| High Shear flow rate: | 20.9 | 19.8 |

EXAMPLE 17

The following foam formulations, after having been intimately blended, were charged to a "Draiswerke" mixer: 80% resin, 12% mica, 0.3% EPB azobisdicarbonamide, 0.35 EPB azobisdicarbonamide, 0.35 antioxidant and 7% calcium carbonate. The charges varied from 2.7 to 4.08 Kg. of the mixture and were fluxed for 14 to 18 seconds. Discharge temperature was 155° C. Thereafter, the products were processed through a gear pump, die formed, cooled and diced.

It was found that by controlling the discharge temperature of the mixture, the foaming agent was not activated, thereby allowing the end user the foam action.

EXAMPLE 18

2.7 to 3.6 Kg. charges of high density polyethylene were charged to the "Draiswerke" mixer. Flux times ranged from 12 to 14 seconds with temperatures rising to 161° to 170° C. The mass produced was processed through a gear pump at temperatures ranging from 190° C. to 220° C. The product from the gear pump die formed (die temperature 260° C.), cooled and pelletized. The appearance of the pellets was good.

EXAMPLE 19 po 2.5 Kg. of the following ingredients, intimately blended, were charged to a "Draiswerke" mixer: 809 LPX-21 (polyethylene - M.I. 6), 20% Petrofin 100 (polybutene) and processed for 10 seconds. The product was then processed through a gear pump, die and dicer. There was no evidence during or after processing of any problems with the low melt index carrier resin. The mixer ran well and processing through the gear pump and dicer was easy and smooth. The low molecular weight polybutene was well dispersed in the polyethylene.

EXAMPLE 20

3.6 Kg of a master batch formulation of 70% RFC-6 $TiO_2$ and 30% 5101 polyethylene was charged to a "Draiswerke" mixer and processed for 15 to 20 seconds, after which the mass produced was densified and compressed through a gear pump, then die formed, cooled and diced. Although somewhat more difficult to pass through the pump than regular material, it was evident that the process and apparatus of this invention is capable of obtaining a high solids content master batch. Dispersion was good when the pellets was blended with resin and formed into film, substantially free from gels or agglomerates.

EXAMPLE 21

50% 484C High impact polystyrene 0.8% LD-8 Ultramarine (blue pigment) and 49.2% 2073 Titanium Dioxide was intimately blended and then charged to a "Draiswerke" mixer in shots ranging from 5 to 10 pounds. Flux time varied fromn 10 to 20 seconds. Discharge temperature was controlled at 199° C. After passing through a gear pump and being die formed, the material was brittle. This problem was solved by addition of 5 to 10% of Kraton (styrene compatible rubber) to the blend.

EXAMPLE 22

To a 40 liter Draiswerke mixer, 6.8 Kg. of scrap material comprising handle cut-outs from grocer bags of linear low density polyethylene containing about 3½% $TiO_2$ were charged. The mixture was fluxed within the mixer for a period of 10 seconds, and discharged at a temperature of 128° C. Upon discharge from the Draiswerke mixer, the mixture comprised a non-readily flowable, high-bulk, self-sustaining mass in a partially molten state. This product was charged to a gear pump operating at a speed of 32 rpm at a temperature of 149° C. Upon exiting the gear pump, the product was passed through a die, water cooled and then pelletized. The product, on exit from the gear pump had a density of 0.927 g/cc and was exited at a rate of approximately 1360 Kg./hr. The physical properties of the product were observed not to have changed significantly, and could have been used for producing grocery bags.

The above procedure was repeated several times and in all cases, no significant changes in physical properties occurred.

EXAMPLES 23-30

Using the general procedures outlined above, the following master batch products were prepared utilizing polypropylene:

| Example | Components | % |
|---|---|---|
| 23 | Shell Polypropylene TY5101 (M.I. 20) | 50 |
|  | $TiO_2$ | 50 |
| 24 | Shell Polypropylene TY5101 | 50 |
|  | Calcium carbonate (UFT) | 50 |
| 25 | Shell Polypropylene TY5101 | 30 |
|  | Calcium carbonate (UFT) | 70 |
| 26 | Himont Polypropylene 6301 (M.I. 12) | 50 |
|  | $TiO_2$ | 50 |
| 27 | Himont Polypropylene 6301 (M.I. 12) | 50 |
|  | Calcium carbonate | 50 |
| 28 | Himont Polypropylene 6301 (M.I. 12) | 30 |
|  | Calcium carbonate | 70 |
| 29 | Himont Polypropylene 6301 (M.I. 12) | 50 |
|  | Carbon black N762 | 50 |
| 30 | Shell Polypropylene TY 5101 (M.I. 20) | 50 |
|  | Carbon black N762 | 50 |

The above master batch products were used in pelletized form in injection molded products formed o polypropylene. It was found that these polypropylene master batch products had better dispersion characteristics in the products than in using a master batch having a polyethylene carrier for molded products of polypropylene.

EXAMPLE 31

To a 40 liter Draiswerke mixing apparatus were charged 6.8 Kg of the following:
50% scrap high density polyethylene film
47½% high density polyethylene resin
1½% carbon black.

The cycle time of this mixture in the mixer was 9 seconds, the mixture being discharged at a temperature of 143° C. in the form of a non-readily flowable, high-bulk, self-sustqaining mass in a partially molten state. The output from the mixer was passed through a gear pump at a temperature of 160° C., operating at 3000 rpm. The output from the gear pump was approximately 1134 Kg/hr. After outputting from the gear pump, a suitable die (e.g. a bottom fed spiral tubing die) produced about a 5 inch diameter tubing on exit from the die expanding to about 6 inches. The tubing was cooled to room temperature in a water-cooled corrugator, thus producing corrugated tubing product having a substantially uniform wall thickness of about 0.076 cm.

EXAMPLE 32

The procedures of Example 21 were repeated except that 3.6 Kg. of a master batch mixture of 50% $TiO_2$ and 50% polystyrene, the latter being in granular form, were used. Mixing and heating were carried out for 20 sec., the temperature rising to 205° C., the product discharged was a non-flowable self-sustaining partially molten mass. Passing through a gear pump at 25 rpm operated at a temperature of 205° C., the ribbon product (bulk density 56 lb/ft³) was produced at 680 Kg/hr (much higher than conventional methods) and was cooled and pelletized. Use of the product showed very good dispersion.

The above Examples describe preferred embodiments only; it will be appreciated that within the broader aspects of this invention, the novel method can be applied to various embodiments without departing from the spirit and scoope of the invention. The present invention can be used with injection molding techniques, wire coating, pipe extrusion, sheet extrusion, flat die extrusion, etc. Devices known in the plastic art, whereby molten material is fed for subsequent processing can be incorporated into the present invention by using the method and apparatus of the invention to feed a flow of molten material to the device.

The method and apparatus of the invention provide a simple and economical way to produce large quantities of flowable resinous feed material to various operations in a manner which overcomes the disadvantages of conventional methods and apparatus. Additionally, the products of the invention provide improvements over the prior art products, some of which are shown in the above Examples, by, e.g., providing higher loading in resinous materials than was possible before, and in addition, by providing resinous materials that can be utilized on the same basis as raw or virgin materials, compounding various polymers and ingredients not to exceed otherwise detrimental temperatures not heretofore possible.

In carrying out the method of the invention, numerous types of resinous materials may be employed, which will be primarily dictated by the type of material to be used in any given application. Typical of the materials which can be employed include the well known polyolefin resins including homo- and copolymers, terpolymers and other like polymers. The materials may range from simple polyolefins—e.g. polyethylene polymers to more complex copolymers and the choice of any particular resinous material will be within the skill of those skilled in the art.

It will be understood that various modifications can be made to the above described embodiments without departing from the spirit and scope of the invention.

We claim:

1. A method of forming extruded products comprising: providing an extrudable material to be extruded; in a first step, simultaneously mixing and heating said material to at least the melting temperature thereof at which point said material is in the form of a relatively non-flowable, self-sustaining mass in a partially molten state, said mass having a relatively low density and having entrapped air therein to help prevent said mass from being flowable; in a second separate step, feeding said relatively low density, non-flowable self-sustaining mass in a partially molten state between a fixed rigid surface and a moving rigid surface of a gear pump to remove said entrapped air from said mass and to densify, compress and convert said mass to a flowable form; and extruding said densified and compressed flowable product.

2. A method as defined in claim 1 for forming a molten resinous profile wherein said first step comprises subjecting a source of resin to a high intensity mixing step and forming a heated, high bulk resinous mass having a temperature of at least the melting point of the resin but not high enough to cause fluid flow thereof and wherein the mixing is carried out until the material is in the form of said non-readily flowable mass, and said second step comprises densifying said high bulk resinous mass into a molten flowable resinous mass by passing the mass between said fixed rigid surface and said moving rigid surface and said extruding is carried out directly through a profile die to form an extruded profile shape.

3. A method as defined in claim 2, wherein the source of resin comprises a base material and at least one master batch additive.

4. A method as defined in claim 3, wherein said material is extruded through a die, the extruded material thereafter being cooled and pelletized.

5. A method as defined in claim 3, wherein said material is comprised of a polyolefin in the form of a copolymer or homo-polymer, said master batch additives are incorporated into said material prior to said mixing and heating said material, and which comprises a further step of pelletizing the extruded material to form master batch pellets of enhanced properties.

6. A method as defined in claim 5, wherein said material includes an additive to form a master batch chosen from coloring agents, forming agents, and the anti-oxidants, anti-block compounds, U.V. inhibitors, and mixtures thereof.

7. A system for extruding products comprising in combination,
    mixing and heating means which simultaneously heat and mix a material to be extruded to at least the melting temperature thereof and to a point where the material is in the form of a non-flowable, self-sustaining mass and which is in a partially molten state, the mass having a low density and having entrapped air therein to help prevent the mass from being flowable;
    means for feeding the mass in this state to a separate compression component;
    said compression component comprising a fixed rigid surface and a moving rigid surface of a gear pump for densifying and compressing said mass to a flowable form; and
    means for extruding the resultant densified and compressed flowable product through a restricted opening.

8. The system of claim 7, said gear pump having a pair of counter rotating gears.

9. The system of claim 8, wherein said gears are angled gears, said gears being adapted to compress a charge of material between the gears and a flat surface to form said densified and compressed mass to a flowable form, said system including discharge means for discharging the flowable mass after passing between said gears and said flat surfaces.

10. The system as defined in claim 8, including a die connected to said restricted opening to form an extruded product having a profile shape.

11. The system of claim 7, wherein said mixing and heating means comprises a high density mixer of the "Draiswerke" type.

12. A method as defined in claim 2, for forming a profile shape in the form of siding, wherein said profile die has a shape to form siding, and extruding siding through said die as a continuous length thereof, and cooling the extruded siding.

13. A method as defined in claim 12, wherein said resin comprises a polyvinyl chloride resin as a homopolymer or copolymer thereof.

14. A method of re-processing film-forming scrap thermoplastic material into raw thermoplastic material and to have substantially the same extrudable properties as the virgin material from which the scrap material was derived from, comprising, feeding discontinued scrap material to a mixing step, simultaneously mixing and heating said material to at least the melting temperature thereof to a point where said material is in the form of a relatively non-flowable, self-sustaining mass in a partially molten state, said mass having a relatively low density and having entrapped air therein to help prevent said mass from being flowable, in a second, separate step, feeding said relatively low density non-flowable self-sustaining mass in a partially molten state between a fixed rigid surface and a moving rigid surface of a gear pump whereby said entrapped air is forced from said mass and said mass is densified, compressed and converted to a flowable form; and extruding said densified and compressed flowable product while maintaining the temperature of said partially molten mass at a temperature below the volatilization or degradation temperature of non-film forming foreign matter of said scrap material.

15. A method as defined in claim 14, wherein the scrap material is comprised of film-forming scrap thermoplastic material having a volatile ink component as a major portion of the foreign matter.

16. A method as defined in claim 14, wherein said partially molten material is passed through a filter to screen out any non-molten foreign material.

17. A method as defined in claim 14, wherein the film-forming thermoplastic material is polyolefin or a mixture of polyolefins.

18. A method as defined in claim 17, wherein said polyolefin is a polyethylene or polypropylene, or a copolymer thereof.

19. A method as defined in claim 14, including the further step of pelletizing the extruded material after densifying said mass.

20. A method as defined in claim 19, wherein the pelletized material is fed into a blown tube process and utilized at least a portion of the feed material for a blown tube process.

21. A method as defined in claim 1 for forming blown film or tube, wherein said material is extruded through a blown tube die and which includes the further step of cooling the tube after extrusion and collapsing the tube to form a blown tube.

22. A method as defined in claim 21, wherein the molten compressed mass is fed directly to a blown tube process and used as a feed polymer for said process.

23. A method for producing a co-extruded product comprising the steps of providing at least two separate feed streams of a thermoplastic resinous material by mixing and heating each feed stream separately to at least the melting temperature of the resinous material and at which point the material is in the form of a relative non-flowable, self-sustaining mass in a partially molten state, the mass having a relatively low density and having entrapped air therein to aid in preventing the mass from being readily flowable, providing sepeate flow paths for each of the streams while in a second, separate step, feeding each relatively low density, non-flowable, self-sustaining mass in a partially molten state separately between a fixed rigid surface and a moving rigid surface of a gear pump to remove said entrapped air from the mass and to densify, compress and convert the mass of each thermoplastic resinous material to a flowable form, combining the streams in the flow direction in a common flow path into a single layer of material and extruding the combined layers as a single extrudate.

24. A method as defined in claim 23, wherein the extrudate is subjected to a pelletizing step to form pellets.

25. A method as defined in claim 23, wherein each of said feed streams comprising a different thermoplastic resinous material, each of said thermoplastic resinous materials having at least one different property relative to each other to form a co-extruded product of two resinous materials each of which has at least one different property relative to the other.

26. A method as defined in claim 23, wherein at least one of the feed streams includes a cross-linking agent, a colouring agent, or a foaming agent.

27. A method for forming a corrugated tube product which comprises subjecting a source of resin to a high intensity mixing step and forming a heated, high bulk resinous mass having a temperature of at least the melting point of the resin but not high enogh to cause fluid flow thereof and wherein the mixing is carried out until the material is in the form of a relatively low density, non-flowable, self-sustaining mass in a partially molten state and having entrapped air therein, and in a second, separate step densifying said high bulk, relatively low density, non-flowable, self-sustaining resinous mass in a partially molten state, into a molten flowable resinous mass by passing the mass between a fixed rigid surface and a moving rigid surface of a gear pump, extruding directly through a tubing die to form an extruded tube shape, and cooling said tube and corrugating said tube.

28. A method for forming a blown tube product comprising subjecting a source of resin to a high intensity mixing step and forming a heated, high bulk resinous mass having a temperature of at least the melting point of the resin but not high enough to cause fluid flow thereof and wherein the mixing is carried out until the material is in the form of a relatively low density, non-flowable, self-sustaining mass in a partially molten state and having entrapped air therein, and in a second, separate step densifying said high bulk, relatively low density, non-flowable, self-sustaining resinous mass in a partially molten state into a molten flowable resinous mass by passing the mass between a fixed rigid surface and a moving rigid surface of a gear pump, extruding directly through a blown tube die to form an extruded tube, expanding the tube and subsequently cooling said tube.

29. In a method of forming extruded products wherein a source of resinous extrudable material is mixed, heated and fed to an extrusion die, the improvement wherein in said mixing and heating step, said resinous extrudable material is formed as a relatively non-flowable, self-sustaining mass in a partially molten state, said mass having a relatively low density with entrapped air to help prevent said mass from being flowable; and in a second, separate step, utilizing said relatively non-flowable, self-sustaining mass in a partially molten state as a feed material between a fixed rigid surface and a moving rigid surface of a gear pump to form a flowable mass with a substantial portion of said entrapped air removed therefrom.

* * * * *